June 2, 1964

R. H. COOPER ETAL 3,135,029

SAND COMPOSITIONS FOR FOUNDRY CORES AND MOLDS COMPRISING
ALKALI METAL SILICATE BINDERS AND ACRYLAMIDE POLYMER
OR WATER-SOLUBLE SULFONATED ALKENYL AROMATIC
POLYMER ADDITIVES, THEIR PREPARATION AND USE

Filed Oct. 31, 1957

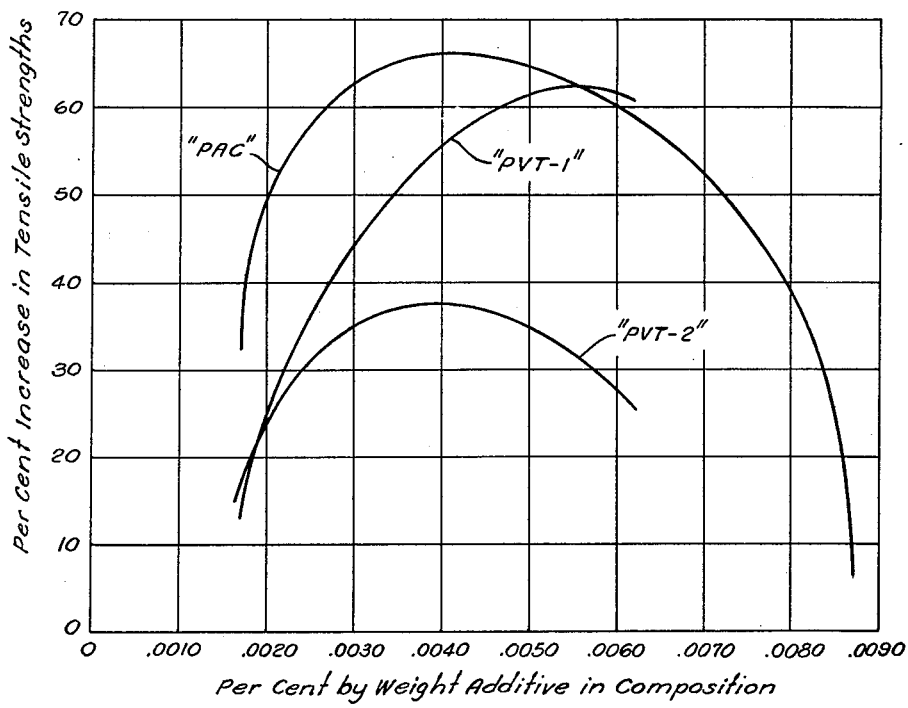

Fig. 1

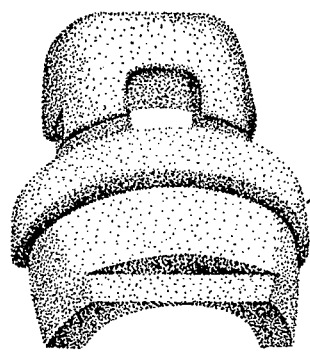

Fig. 2

Foundry core bonded with alkali metal silicate binder containing a minor proportion of an acrylamide polymer additive or a water-soluble sulfonated alkenyl aromatic polymer additive.

INVENTORS.
Ronald H. Cooper
Gerald M. Corbett
Nathan A. Noeske

BY

Griswold & Burdick
ATTORNEYS.

United States Patent Office 3,135,029
Patented June 2, 1964

3,135,029
SAND COMPOSITIONS FOR FOUNDRY CORES AND MOLDS COMPRISING ALKALI METAL SILICATE BINDERS AND ACRYLAMIDE POLYMER OR WATER-SOLUBLE SULFONATED ALKENYL AROMATIC POLYMER ADDITIVES, THEIR PREPARATION AND USE
Ronald H. Cooper, Clare, and Gerald M. Corbett and Nathan A. Noeske, Midland, Mich., assignors to The Dow Chemical Company, Midland, Mich., a corporation of Delaware
Filed Oct. 31, 1957, Ser. No. 693,737
18 Claims. (Cl. 22—193)

This invention relates to the use of certain polymeric organic additives in sodium (and other alkali metal) silicate-containing sand compositions to improve the physical properties of foundry cores and molds (especially the former) fabricated therewith for use in metal casting operations. It also relates to an improved method for casting metals, particularly ferrous metals, in molds fabricated from the improved sodium silicate bonded sand compositions of the present invention.

Sodium silicate is a well known binder material for foundry sands, it has been extensively employed for this purpose, particularly when foundry cores (as well as certain molds) are being fabricated for specialty applications. Equivalent results can generally be obtained with other so-called artificial alkali metal silicates, including potassium silicate and lithium silicate.

There has in recent years been developed an improved method for the utilization of aqueous solutions of sodium silicate as a binder in sand compositions suitable for fabrication of foundry molds and cores. This method, which is well known, is generally referred to as the carbon dioxide ($CO_2$) process. The $CO_2$ process permits cores and molds to be made with a mixture of sand and an aqueous solution of sodium (or other alkali metal) silicate and hardened in very short order by passing carbon dioxide gas through the wet composition after it has been fabricated into a desired shape. The gas combines chemically with the silicate binder of the sand composition to form a silicic acid gel which cements the sand grains together and accomplishes the desired binding in periods of time that may be as short as several seconds. Sodium (and other alkali metal) silicate bonded cores and molds that have been made by the $CO_2$ process can be used for metal casting very soon after the gassing of the fabricated structures. The $CO_2$ process has been described at page 33 of "Modern Castings" for August 1956, and at page 111 of "Steel" for August 6, 1956.

The major disadvantage encountered in the employment of silicate bonded sand compositions in foundry molds and cores, including those that have been prepared by the $CO_2$ process, is that of poor collapsibility after the metal has been poured in and solidified in the mold. In contrast to organic binders, sodium (and other alkali metal) silicate does not burn out at low temperatures, but sinters with the sand at high temperatures to form glasses. Such sintering begins to occur at a temperature of about 1475° F. and increases rapidly above about 1560° F. As a consequence, collapsibility and shake-out features are generally very poor and frequently inadequate in sand molds and cores bonded with sodium silicate and the like and the castings may be disadvantageously difficult to remove.

While better collapsibility may be obtained in cores and molds of the indicated compositions by reducing the quantity of silicate that is employed as a binder, such practice is generally undesirable for the reason that when compositions containing less than about 3 percent by weight of silicate binder (taken as the weight of the aqueous solution or dispersion of silicate employed) are involved, the resulting molds and cores become exceedingly friable and, frequently, may not be acceptable for general foundry usage. Collapsibility in sodium (and other alkali metal) silicate bonded sand compositions may also be benefitted to a minor extent by incorporating as an additive in the compositions minor proportions (usually in the neighborhood of 2 to 6 percent by weight, based on the weight of the silicate bonded sand compositions in which the additive is incorporated) of certain filler or burn out materials, including such substances as asphalt emulsions, cellulose fibers, cereal binders, gilsonite, graphite, sea coal, pitch, wood flour, dextrins, iron oxide and the like. Such conventionally employed materials, however, are usually a nuisance to work with and difficult to handle in the formulation of the sand compositions. In addition, they oftentimes possibilitate only limited success since they frequently increase the friability of the molds and cores fabricated from compositions in which they are contained, despite the fact that they may exert a beneficial influence on collapsibility. Use of a coarser sand also tends to help collapsibility. Such practice may not always provide a desirable expedient for the reason that it may result in a poor surface finish to be obtained in the resulting castings.

It is an object of the present invention to provide improved silicate bonded sand compositions, particularly sodium and other alkali metal bonded sand compositions, including, in particular, those for use in the $CO_2$ process, that are capable of being fabricated into excellent quality foundry cores and molds having high strength and excellent collapsibility or shake-out characteristics and features.

Another object of the invention is to provide an improved process for casting metals in molds and cores made of the silicate bonded sand compositions modified in accordance with the present invention.

These and corollary objects and associated benefits and advantages may be achieved by practice of the present invention which comprises uniformly incorporating in a foundry sand composition for the preparation of molds and cores which contains an aqueous dispersion or solution of sodium or other alkali metal silicate as a binder, a minor proportion of a polymeric organic additive selected from the group consisting of acrylamide polymers and copolymers that contain in the polymer molecule at least about 85 percent by weight of acrylamide (particularly polyacrylamide), water-soluble sulfonated alkenyl aromatic polymers (particularly water-soluble sulfonated polyvinyl toluene) and mixtures thereof. Advantageously, the quantity of the indicated variety of polymeric organic additive that is incorporated in the sodium or other alkali metal silicate-containing sand composition in the practice of the present invention is an amount between about 0.001 and 0.1 percent by weight, preferably between about 0.009 and 0.06 percent, based on the weight of the aqueous silicate dispersion or solution used in the preparation of the composition.

The acrylamide polymer or water-soluble sulfonated alkenyl aromatic polymer additives that are used in the practice of the present invention may be incorporated in the sand compositions in any desired manner, including directly mixing or mulling the polymeric additives in a silicate-containing sand mixture. It is most convenient, however to incorporate the polymeric organic additives that are employed by dispersing or dissolving them in the aqueous dispersion or solution of sodium or other alkali metal silicate that is used as a binder for the sand prior to the mixing of the silicate solution with the sand in order to form the foundry core and mold compositions. Dispersions or solutions of acrylamide polymers or water-soluble sulfonated alkenyl aromatic polymers in the aqueous silicate compositions are easy to handle and have exceptionally good shelf life. Ordinarily, they may be stored without difficulty for periods of several months and employed thereafter with as much benefit as freshly made compositions.

Advantageously, the silicate bonded sand compositions of the present invention may be employed for making molds and cores according to the above indicated $CO_2$ process by passing the gas through the composition after it has been fabricated into a desired shape for foundry use. If desired, however, the sodium or other alkali metal silicate bonded compositions can be permitted to harden in the normal manner without reliance on carbon dioxide by letting them become set up in air or subjecting them to heat at an elevated temperature, as by baking them in an oven according to the usual well known techniques and procedures.

The silicate bonded sand compositions which contain acrylamide polymer or water-soluble sulfonated alkenyl aromatic polymer additives in accordance with the invention may be fabricated into excellent foundry cores and molds having improved physical qualities including high bond strength and very good collapsibility and shake-out features. As has been indicated, they may be used with particular advantage for preparing molds and cores according to the $CO_2$ process. The resulting molds and cores may be employed for the casting of any desired metal, including iron and other ferrous alloys, to provide excellent results in the casting operations. The molds and cores fabricated from the compositions of the present invention permit good quality castings to be obtained that are precisely formed and have desirable surface finishes.

The silicate bonded sand compositions that are improved by practice of the present invention may be pursuant to the heretofore known compositions for such purposes. Thus, the usual quantities of aqueous sodium or other alkali metal silicate solution may be employed for providing the binder. For example, amounts of an aqueous alkali metal silicate dispersion, such as an aqueous sodium silicate solution, between about 3 and 10 percent by weight, preferably on the order of from 4 to 6 percent by weight, based on the weight of the resulting wet sand composition, may be advantageously utilized in the composition as the binding constituent therefor; with, as is obvious, any balance being essentially sand. As has been indicated, the silicate dispersions or solutions which may be employed are the silicates of the alkali metals of atomic number from 3 to 19, i.e., lithium, sodium and potassium. For most purposes, it is generally advantageous to utilize sodium silicate solutions or dispersions in water in order to bond the sand compositions. The solids content of the silicate dispersion or solution that is employed may be of any concentration that is adapted to provide for the efficient and effective bonding of the sand compositions. It is ordinarily beneficial for the concentration of the aqueous silicate dispersion or solution to be at least about 10 percent by weight (generally, approximately 10° Bé.). Usually it is desirable to employ more concentrated solutions or dispersions of the silicate, such as those whose concentration is at least in the neighborhood of 30 percent by weight (usually approximately 30° Bé.). Preferably, between about 45 and 50° Bé., particularly when solutions of sodium silicate are involved in which the $SiO_2$ to $Na_2O$ ratio is greater than 2. It is usually unnecessary to employ the silicate solutions or dispersions in concentrations much greater than about 50–55 percent by weight, even if they are available in such strengths. As is evident, it is usually most advantageous to employ sodium silicate solutions of the indicated concentrations. These are usually the commercial meta silicates, in which the ratio of $SiO_2$ to $Na_2O$ is greater than 2. If desired, however, the ortho-sodium silicates, in which the ratio of $SiO_2$ to $Na_2O$ is as low as 0.5:1, may be utilized even though it is generally necessary to employ them in aqueous dispersion due to their insolubility or only partial solubility in water.

Any ordinary sand or other refractory material may be employed in the practice of the invention. Advantageously, the sand or its equivalent that is employed has a fineness in accordance with the values proposed by the American Foundrymans Society (AFS) that is in the numerical range between about 25 and 180. Such sands, for example, as the types which are known as Berkeley Float Sand, Juniata Sand, Lake Sand, Vassar Sand, Wedron Sand, and the like are quite suitable. It is not necessary in the practice of the present invention that clean sand be utilized. As a matter of fact, better results are frequently achieved when an unwashed sand is employed. In many cases it may be more advantageous to utilize an unwashed sand having a AFS fineness number from about 50 to 125. Very frequently sands that have a AFS fineness number in the neighborhood of 50–75 may be preferable for foundry cores and mold making operations.

The acrylamide polymers that may be employed in the practice of the present invention are, as is hereinafter apparent, water-soluble materials. They include the homopolymer of acrylamide as well as copolymers of acrylamide with up to about 15 percent by weight of other suitable monomers such as alkenyl esters of acrylic acid and methacrylic acid, methacrylamide, styrene, vinyl acetate, acrylonitrile, methacrylonitrile, vinyl alkyl ethers, vinyl and vinylidene chloride and the like. As is apparent, the comonomers employed in the water-soluble acrylamide copolymers are monoethylenically unsaturated monomeric materials that are copolymerized with monomeric acrylamide. Advantageously, the acrylamide polymers that are utilized are characterized in having a viscosity of at least about 4 centipoises (measured at a temperature of about 21.5° C.) in 0.5 percent by weight aqueous solutions thereof that have been prepared with distilled water adjusted to a pH of 3 to 3.5. The acrylamide polymers that are employed may be partially hydrolyzed, although it is generally preferable for the degree of hydrolysis in the polymer to be less than about 10–15 percent. As will be appreciated by those skilled in the art, there is literally no upper limit on the molecular weight of the acrylamide polymer that can be employed as any of the practically available high molecular weight polymers are useful. Most advantageously, as has been indicated in the foregoing, the homopolymer of acrylamide is employed as the acrylamide polymer in the practice of the present invention. Such a material having a viscosity, as above described, between about 6 and 10 centipoises with a degree of hydrolysis less than about 10 percent, generally in the neighborhoood of about 5 percent, is available from The Dow Chemical Company under the trade-designation "Separan 2610."

The water-soluble sulfonated alkenyl aromatic polymer that may be employed as an additive in the practice of the invention may be any of the alkenyl aromatic polymers that have been sulfonated to a sufficient extent to render them soluble in water. By way of illustration, water-soluble sulfonated polymers, copolymers and interpolymers or graft copolymers of styrene, alpha methyl styrene, ar-methyl styrene (vinyl toluene), aromatic isopropyl styrene, mono- and dichlorostyrene, aromatic dimethyl styrene, ethyl vinyl benzene and the like may be utilized with especial benefit. As is well understood in the art, alkenyl aromatic polymers are those containing or derived from at least about 50 percent by weight of at least one alkenyl aromatic compound having the general formula $G—CX=CH_2$, wherein G is an aromatic radical and X is selected from the group consisting of a hydrogen atom and a methyl radical. The sulfonated alkenyl aromatic polymers (which may be either the free acid or alkali metal salt forms) may be derived from polymers having molecular weights as low as 50 thousand and viscosities, as measured in 10 percent toluene solution at room mtemperature, as low as about 10 centipoises to molecular weights and viscosities as high as several million and 4,000–5,000 centipoises, respectively. Ordinarily, in order to render an alkenyl aromatic polymer water-soluble, it is necessary for at least about 75 percent of the recurring, characterizing, polymerized alkenyl aromatic groups in the polymer to be sulfonated each with a single sulfonate substituent. As much as 90 percent or more of such recurring characterizing groups may be sulfonated in the water-soluble sulfonated alkenyl aromatic polymer, although, in the usual case, a degree of sulfonation between about 80 and 85 percent is found to be quite suitable. Most advantageously, the water-soluble sulfonated aromatic polymer that is employed in the practice of the present invention is sulfonated polyvinyl toluene derived from polyvinyl toluene having a molecular weight between about 300 thousand and a million and a viscosity as measured in 10 percent toluene solution at room temperature between about 100 and 1,000 wherein the degree of sulfonation is at least about 75 percent, preferably from 80 to 85 percent. Sulfonated polystyrene of analogous characteristics may also be utilized with benefit.

By way of further illustration, several different sodium silicate bonded sand mixtures were prepared in accordance with the present invention by individually incorporating minor proportions of "Separan 2610" and two different sulfonated polyvinyltoluenes therein. The polymeric organic additives were incorporated in the compositions by dispersing them in the aqueous sodium silicate solution that was employed as a binder prior to mixing the silicate solution with the sand. E. I. du Pont de Nemours & Co., Inc., No. 22 sodium silicate solution was used to prepare the silicate binding solution employed. It contained 1 part of $Na_2O$ to 2.3–2.6 parts of $SiO_2$. The compositions were then formed into standard size figure 8 briquette sand cores by exerting about 80 p.s.i. pressure on the wet sand mixture which had been mulled in a conventional manner in order to intimately and uniformly blend the additive-containing sodium silicate solution with the sand. Some of the briquettes were cured according to the $CO_2$ process by passing carbon dioxide gas through them under about 15 pounds pressure for periods of time ranging from 10 to 20 seconds. Other of the briquettes were cured by heating them in an oven after their formation for about 25 minutes at a temperature of 325° F. Unwashed Vassar Bank Sand (AFS 95–100) was employed in the preparation of all of the compositions. The combined total content of clay and alkali material in the said was found, upon analysis, to vary from about 1.1 to 1.4 percent by weight. The results are set forth in the following tabulation, wherein additive PAC indicates the "Separan 2610;" additive PVT–1 indicates a water-soluble sulfonated polyvinyltoluene in the form of its sodium salt that was derived from a parent polymer having a molecular weight of about 1 million and a viscosity in 10 percent toluene solution at room temperature of about 1,000 centipoises and in which the degree of sulfonation was about 80 percent; and PVT–2 indicates a similarly sulfonated polyvinyltoluene derived from a parent polymer having a molecular weight between about 300 and 400 thousand and a viscosity of about 100 centipoises. In the table, the term "bonded strength" refers to the maximum tensile stress necessary to rupture a test briquette of standard dimensions. It is measured in pounds per square inch (p.s.i.) and is also representative of the maximum tensile stress which a sand mixture is capable of developing. "Surface hardness" is measured on the smooth side of the briquette specimen with a Dietert No. 673 Dry Hardness Tester. In this test the instrument is pressed down on the specimen. The maximum hardness reading on a hard surface would be 100 units. "Collapsibility" or "shake-out" is a term used with regard to the disintegratability of the sand mold after solidification of the molten metal therein. The collapsibility test consists of determining the tensile strength of a specimen which has been heated without access to air for one hour at 650° F. A "hot strength" test is similarly performed. From practice, one can determine the proper hot strength that will prevent hot cracking of castings due to weak cores at 650° F., 1000° F., and so on up to 2500° F.

TABLE

*Effect of Additives on Tensile Strength*

| Sample | Percent by wt. 50° Bé sodium silicate | Additive | Percent by wt. additive in sodium silicate solution | Percent by wt. additive in total mix | $CO_2$ cured sand cores | | | | | Oven cured sand cores | | | | |
|---|---|---|---|---|---|---|---|---|---|---|---|---|---|---|
| | | | | | Average tensile strength | | | | Surface hardness test average | Average tensile strength | | | | Surface hardness test |
| | | | | | Bond strength 24 hours after gassing | Collapsibility test[a] | Percent increase in p.s.i. over control sample[b] | Percent collapsibility[c] | | Oven cured at 325° F. for 25 min. | Collapsibility test | Percent increase in p.s.i. over control sample | Percent collapsibility | |
| "A" | 6 | None | None | None | 264 | 150 | ---------- | 43.5 | 95 | 393 | 194 | ---------- | 50.6 | 96 |
| "B" | 6 | PAC | 0.0274 | 0.0017 | 361 | 118 | 36.7 | 67.4 | 95 | 474 | 160 | 20.6 | 66.3 | 94 |
| "C" | 6 | PAC | 0.0639 | 0.0038 | 441 | 172 | 67.0 | 61.0 | 95 | 468 | 210 | 19.1 | 55.2 | 95 |
| "D" | 6 | PAC | 0.1000 | 0.0060 | 428 | 150 | 62.0 | 65.0 | 95 | 468 | 185 | 19.1 | 60.2 | 95 |
| "E" | 6 | PAC | 0.1365 | 0.0087 | 285 | 200 | 8.0 | 29.7 | 94 | 429 | 210 | 9.1 | 51.0 | 64 |
| "F" | 6 | PVT-1 | 0.0274 | 0.0017 | 302 | 188 | 14.4 | 37.7 | 93 | 530 | 109 | 34.8 | 79.2 | 94 |
| "G" | 6 | PVT-1 | 0.0639 | 0.0038 | 411 | 200 | 55.6 | 51.4 | 94 | 535 | 105 | 36.1 | 80.0 | 94 |
| "H" | 6 | PVT-1 | 0.1000 | 0.0060 | 429 | 173 | 62.5 | 59.9 | 94 | 537 | 225 | 36.5 | 58.1 | 94 |
| "I" | 6 | PVT-2 | 0.0274 | 0.0017 | 308 | 80 | 16.7 | 74.0 | 94 | 498 | 160 | 26.7 | 67.8 | 94 |
| "J" | 6 | PVT-2 | 0.0639 | 0.0038 | 367 | 198 | 39.0 | 46.0 | 94 | 528 | 215 | 34.4 | 59.2 | 94 |
| "K" | 6 | PVT-2 | 0.1000 | 0.0060 | 339 | 235 | 28.4 | 30.7 | 94 | 477 | 326 | 21.4 | 31.6 | 94 |
| "L" | 4.5 | None | None | None | 148 | 57 | ---------- | 61.4 | 93 | 329 | 188 | ---------- | 42.8 | 94 |
| "M" | 4.5 | PAC | 0.0274 | 0.0012 | 164 | 58 | 10.8 | 64.4 | 93 | 300 | 61 | ---------- | 79.6 | 93 |
| "N" | 4.5 | PAC | 0.0639 | 0.0028 | 172 | 50 | 16.2 | 70.8 | 94 | 376 | 70 | 14.3 | 81.4 | 94 |
| "O" | 4.5 | PAC | 0.1000 | 0.0045 | 219 | 60 | 48.0 | 72.5 | 94 | 377 | 125 | 14.6 | 66.8 | 94 |
| "P" | 4.5 | PVT-1 | 0.0274 | 0.0012 | 177 | 50 | 19.6 | 71.8 | 93 | 356 | 54 | 8.2 | 84.3 | 93 |
| "Q" | 4.5 | PVT-1 | 0.0639 | 0.0028 | 173 | 55 | 16.9 | 66.3 | 94 | 375 | 63 | 14.0 | 83.1 | 94 |
| "R" | 4.5 | PVT-1 | 0.1000 | 0.0045 | 196 | 58 | 32.5 | 70.5 | 94 | 389 | 105 | 18.2 | 72.9 | 94 |
| "S" | 4.5 | PVT-2 | 0.0274 | 0.0012 | 181 | 38 | 22.5 | 78.0 | 93 | 368 | 122 | 11.9 | 66.9 | 93 |
| "T" | 4.5 | PVT-2 | 0.0639 | 0.0028 | 166 | 68 | 12.2 | 59.0 | 94 | 364 | 89 | 10.6 | 75.4 | 94 |
| "U" | 4.5 | PVT-2 | 0.1000 | 0.0048 | 161 | 55 | 8.8 | 66.0 | 94 | 348 | 155 | 5.8 | 55.4 | 94 |

[a] Collapsibility tests = p.s.i. after specimens were exposed to 650° F. for 1 hour without air.
[b] Percent increase in p.s.i. = average p.s.i. increase divided by p.s.i. of control × 100.
[c] Percent collapsibility = average p.s.i. decrease divided by original p.s.i. × 100.

As is apparent from the foregoing, the samples prepared from the compositions of the present invention showed an improvement in bond or tensile strength of 40 to 60 percent and an increase collapsibility of 20 to 50 percent over control samples formulated identically excepting for the additive. None of them exhibited excessive or objectionable friability characteristics. The improvement in bond strength achieved with each of the additives is depicted graphically in FIGURE 1 of the accompanying drawing using the results from samples "A" through "K," inclusive. The increase in collapsibility values between the control samples and the samples containing the additives of the present invention.

By way of still further illustration, additional sodium silicate bonded sand mixtures were prepared following the foregoing general procedure using minor proportions of "Separan 2610" as an additive, but employing an aqueous dispersion of sodium ortho silicate (one part $Na_2O$ to 0.5 part $SiO_2$) having a specific gravity of about 1.60 in order to bond the same unwashed Vassar Bank Sand as described above and using a 30 second gassing time with the $CO_2$. Compositions containing about 6 percent of the aqueous dispersion of the sodium ortho silicate binder and about 0.375 percent of the additive provided excellent results with respect to bond strength, were not objectionably friable and had suitable collapsibility. The bond strength of the additive-containing samples averaged almost 25 percent greater than that of similarly prepared controls that did not contain the additive while the collapsibility of the additive-containing samples was increased by a factor of about 45 percent over the control.

Results similar to the foregoing may be obtained when water-soluble sulfonated polystrene in either free acid or alkali metal salt form is utilized in the above indicated manner as an organic additive and when other alkali metal silicates, including potassium and lithium silicates, wherein the ratio of $SiO_2$ to alkali oxide is at least about 0.5 part by weight to 1, respectively, and more advantageously, at least about 2 to 1, particularly when potassium silicates are utilized.

Cores and molds prepared from the sand compositions of the present invention (similar to those illustrated in the foregoing) which are cured by either heating at elevated temperatures or by practice of the $CO_2$ process are well adapted and can advantageously be used successfully to cast grey iron according to conventional techniques and to provide excellent results in the finished castings. The castings obtained are precisely formed and have good surface finishes. After the casting, the collapsibility and shake-out characteristics of the forms (especially cores) are found to be excellent. A foundry sand core fabricated from a sand composition in accordance with the present invention is illustrated in FIGURE 2 of the hereto annexed drawing.

What is claimed is:
1. Composition for the fabrication of foundry cores and molds which comprises (1) between about 97 and about 90 percent by weight, based on the weight of the composition, of sand; (2) between about 3 and about 10 percent by weight, based on the weight of the composition, of an aqueous dispersion of an alkali metal silicate of an alkali metal of atomic number 3 to 19 having a silicate concentration of at least about 10 percent by weight and a silica to alkali metal oxide ratio of at least 0.5 to 1; and (3) a polymeric organic additive selected from the group consisting of water-soluble acrylamide polymers that contain in the polymer molecule at least about 85 percent by weight of polymerized acrylamide, any balance being another polymerized monoethylenically unsaturated monomeric material that is copolymerizable with acrylamide, water-soluble sulfonated alkenyl aromatic polymers consisting of at least one polymerized alkenyl aromatic compound having the general formula:

$$G-CX=CH_2$$

wherein G is an aromatic radical and X is taken from the class consisting of hydrogen and methyl, and mixtures thereof; said polymeric organic additive being present in said composition in an amount between about 0.001 and 0.1 percent by weight, based on the weight of the aqueous silicate dispersion in the composition.

2. The composition of claim 1 containing between about 4 and 6 percent by weight of said aqueous dispersion of alkali metal silicate, based on the weight of the composition, and from about 0.009 to about 0.06 percent by weight of said polymeric organic additive, based on the weight of the aqueous silicate dispersion in the composition.

3. A composition in accordance with the composition set forth in claim 2, wherein said aqueous dispersion of alkali metal silicate is an aqueous solution of sodium silicate having a concentration of from about 30 to 50° Bé. and a $SiO_2$ to $Na_2O$ ratio of at least 2:1.

4. The composition of claim 1, wherein said polymeric organic additive is polyacrylamide.

5. The composition of claim 1, wherein said polymeric organic additive is sulfonated polyvinyltoluene.

6. The composition of claim 1, wherein said polymeric organic additive is sulfonated polystyrene.

7. Method for improving sand compositions containing sand and aqueous dispersions of an alkali metal silicate of an alkali metal of atomic number 3 to 19 as a binder and adapted to be fabricated into foundry cores and molds which method comprises uniformly incorporating in said composition between about 0.001 and 0.1 percent by weight, based on the weight of the aqueous silicate dispersion in said wet sand composition, of a polymeric organic additive selected from the group consisting of water-soluble acrylamide polymers that contain in the polymer molecule at least about 85 percent by weight of polymerized acrylamide, any balance being another polymerized monoethylenically unsaturated monomeric material that is copolymerizable with acrylamide, water-soluble sulfonated alkenyl aromatic polymers consisting of at least one polymerized alkenyl aromatic compound having the general formula: $G-CX=CH_2$, wherein G is an aromatic radical and X is taken from the class consisting of hydrogen and methyl, and their mixtures.

8. The method of claim 7 wherein said aqueous dispersion of alkali metal silicate is an aqueous solution of sodium silicate having a concentration between about 30 and 50° Bé. and a $SiO_2$ to $Na_2O$ ratio of at least 2:1.

9. In the method of fabricating foundry molds and cores from sand compositions comprising between about 97 and about 90 percent by weight, based on the weight of the composition, and between about 3 and about 10 percent by weight, based on the weight of the composition, of an aqueous dispersion of an alkali metal silicate of an alkali metal of atomic number 3 to 19 as a binder, wherein said sand is mixed with the aqueous silicate dispersion having a silicate concentration of at least about 10 percent by weight and a silica to alkali metal oxide ratio of at least 0.5:1 and said composition is fabricated and subsequently cured, the improvement which comprises uniformly incorporating in said sand composition prior to its fabrication and curing, a minor proportion, in an amount between about 0.001 and 0.1 percent by weight, based on the weight of the aqueous silicate dispersion in said wet sand composition, of a polymeric organic additive selected from the group consisting of water-soluble acrylamide polymers that contain in the polymer molecule at least about 85 percent by weight of polymerized acrylamide, any balance being another polymerized monoethylenically unsaturated monomeric material that is copolymerizable with acrylamide, water-soluble sulfonated alkenyl aromatic polymers consisting of at least one polymerized alkenyl aromatic compound having the general formula: $G-CX=CH_2$, wherein G is an aromatic radical and X is taken from the class consisting of hydrogen and methyl, and their mixtures.

10. The method of claim 9 wherein said aqueous dispersion of alkali metal silicate is an aqueous solution of sodium silicate having a concentration between about 30 and 50° Bé. and a $SiO_2$ to $Na_2O$ ratio of at least 2:1.

11. The method of claim 9, wherein said polymeric organic additive is polyacrylamide.

12. The method of claim 9, wherein said polymeric organic additive is sulfonated polyvinyltoluene.

13. The method of claim 9, wherein said polymeric organic additive is sulfonated polystyrene.

14. A shaped article for molding metals in casting processes, said article being fabricated from a composition in accordance with the composition set forth in claim 1.

15. A shaped article for molding metals in casting processes, said article being fabricated from a composition in accordance with the composition set forth in claim 3.

16. The method of casting metals which comprises mixing between about 97 and about 90 percent by weight, based on the weight of the resulting composition, of sand with between about 3 and about 10 percent by weight, based on the weight of the resulting composition, of an aqueous dispersion of an alkali metal silicate of an alkali metal of atomic number 3 to 19 having a silicate concentration of at least about 10 percent by weight and a silica to alkali metal ratio of at least 0.5:1, said composition containing a minor proportion of between about 0.001 and 0.1 percent by weight, based on the weight of the aqueous dispersion of alkali metal silicate in the wet sand composition, of a polymeric organic additive selected from the group consisting of water-soluble acrylamide polymers that contain in the polymer molecule at least about 85 percent by weight of polymerized acrylamide, any balance being another polymerized monethylenically unsaturated monmeric material material that is copolymerizable with acrylamide, water-soluble sulfonated alkenyl aromatic polymers consisting of at least one polymerized alkenyl aromatic compound having the general formula: $G-CX=CH_2$, wherein G is an aromatic radical and X is taken from the class consisting of hydrogen and methyl, and their mixtures; forming a mold of the resulting sand composition; pouring the metal while molten in the resulting mold; and thereafter solidifying the metal in said mold by cooling it therein to a temperature beneath its melting point.

17. The method of claim 16 wherein said aqueous dispersion of alkali metal silicate is an aqueous solution of sodium silicate having a concentration between about 30 and 50° Bé. and a $SiO_2$ to $Na_2O$ ratio of at least 2:1.

18. The method of claim 16, wherein said metal that is cast is a ferrous metal.

References Cited in the file of this patent

UNITED STATES PATENTS

| | | |
|---|---|---|
| 2,616,818 | Azorlosa | Nov. 4, 1952 |
| 2,625,529 | Hedrick et al. | Jan. 13, 1953 |
| 2,817,128 | Wickett | Dec. 24, 1957 |
| 2,923,701 | Schuller et al. | Feb. 2, 1960 |

FOREIGN PATENTS

| | | |
|---|---|---|
| 531,968 | Canada | Oct. 16, 1956 |

OTHER REFERENCES

Gotheridge et al., "Foundry," pages 128–135, March 1956.

The Iron Age, pages 99–101, April 25, 1957.